United States Patent

[11] 3,536,114

[72] Inventor  Gerald R. Anderson
               Campbell, California
[21] Appl. No. 684,850
[22] Filed     Nov. 21, 1967
[45] Patented  Oct. 27, 1970
[73] Assignee  FMC Corporation
               San Jose, California
               a corporation of Delaware

[54] FRUIT STEM END CUTTER
     8 Claims, 4 Drawing Figs.
[52] U.S. Cl. .................................................... 146/81
[51] Int. Cl. ............................................. A23n 15/02
[50] Field of Search .......................................... 146/81, 52,
                                              42; 77/58.1, 73.5

[56]            References Cited
            UNITED STATES PATENTS
1,515,548  11/1924  Cerotsky ...................... 77/58.1
3,382,901   5/1968  Pheterson ..................... 146/81X
3,259,159   7/1966  Anderson et al ............. 146/81

Primary Examiner—Andrew R. Juhasz
Assistant Examiner—Z.R. Bilinsky
Attorney—Francis W. Anderson ABSTRACT: A rotary cutter has a radially-extending, forwardly facing cutting edge with a relatively large opening in the body of the cutter in front of the cutting edge. Accordingly, when the cutter is rotated on an axis in alignment with the axis of the fruit and is advanced toward the stem end of the fruit, any stem projecting from the end of the fruit will enter the opening in the cutter in front of the radial cutting edge and be sliced off as the cutter advances in its stem-end trimming operation.

Patented Oct. 27, 1970
3,536,114
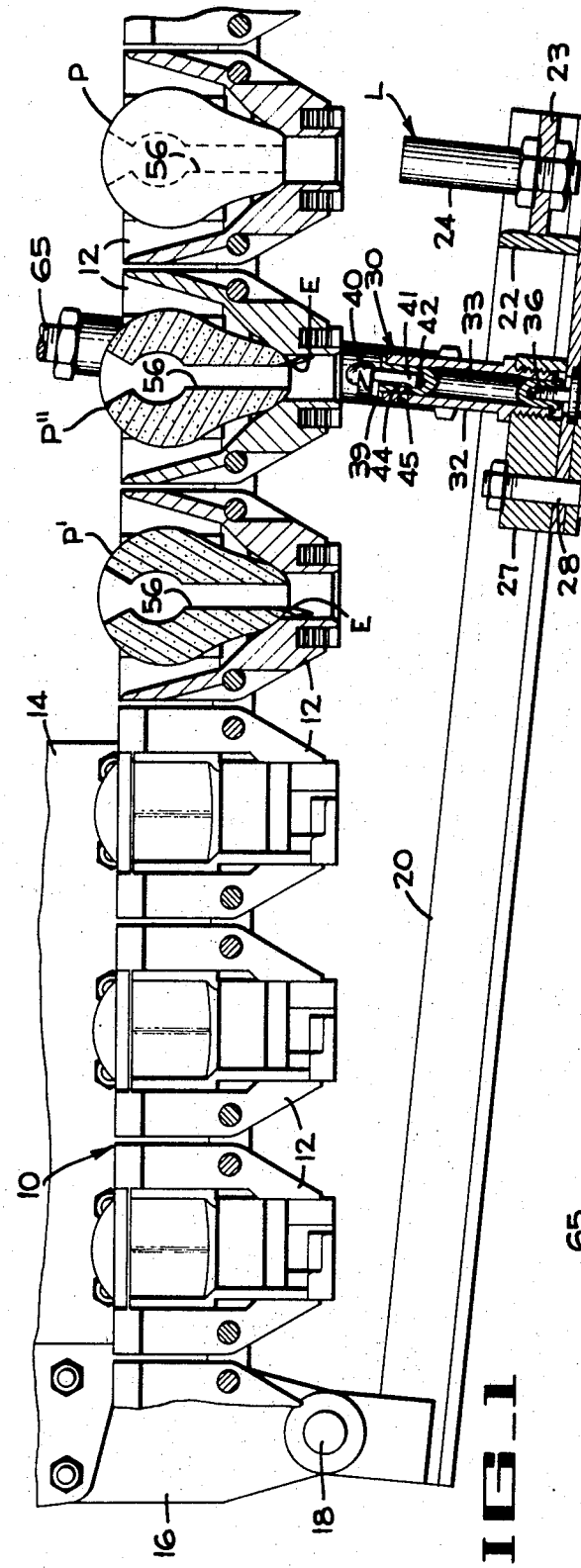
FIG.1
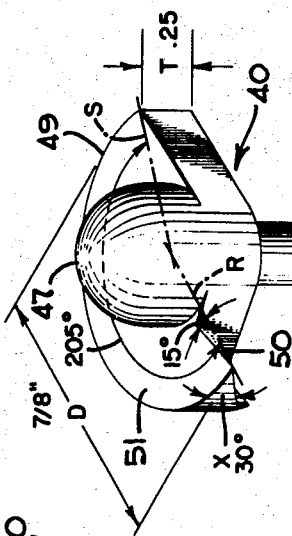
FIG.2
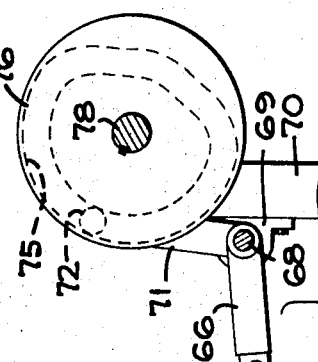
FIG.3
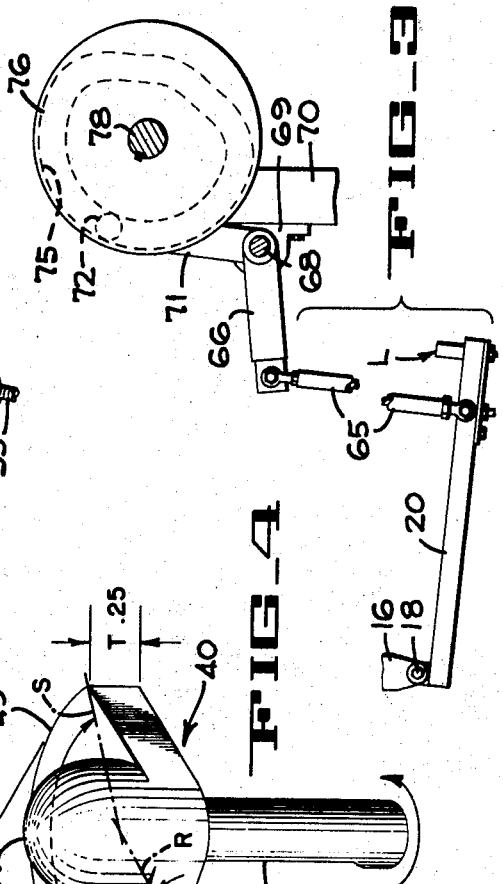
FIG.4
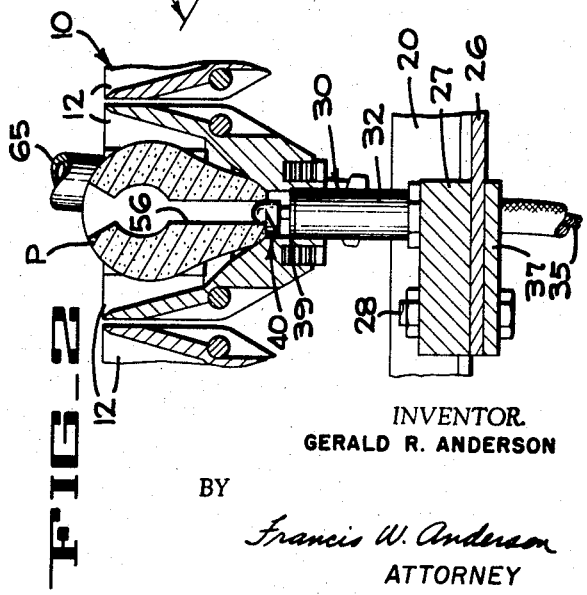
INVENTOR.
GERALD R. ANDERSON
BY
*Francis W. Anderson*
ATTORNEY

FRUIT STEM END CUTTER

BACKGROUND OF INVENTION

This invention relates to fruit processing equipment, and more particularly to cutters for trimming fruit such as pears.

Prior devices, such as that disclosed in the U.S. Pat. to Anderson et al. No. 3,259,159, have been provided to trim the stem end of fruit. In general these devices have cutting edges that are advanced into engagement with the stem end of fruit, which has already been stemmed and cored, to trim the end of the fruit and cause the fruit to have a flat end surface. Some of these cutting devices have openings in the surface that is advanced toward the stem end of the fruit, however, the cutters are rotated so fast and these openings are so small, or are so oriented, that any stem projecting from the fruit does not have enough time to enter an opening before the opening has passed by. The present invention overcomes this difficulty by providing an opening in the disc-like body of the cutter that extends around a considerable portion of the angular extent of the cutter, thus assuring that any stem or stem fragment on the fruit will move to a position in front of the cutting edge in time to be cut off.

SUMMARY OF THE PRESENT INVENTION

The cutter of the present invention is a fragmentary disc-like member that is cut away over a considerable portion of its angular extent. On the trailing edge of the opening in the member, a forwardly-facing radially-extending cutting edge is provided so that, as the cutter is advanced toward the stem end of the fruit, any projecting piece of stem or the like will enter the opening and be progressively cut off during each rotation of the cutter in its stem-trimming operation.

Other features of the invention will be apparent from the following description taken in connection with the accompanying drawings.

IN THE DRAWINGS

FIG. 1 is a fragmentary side elevation of the trimming mechanism of the present invention as applied to fruit processing machinery presently used in the industry, with parts thereof being broken away for the purpose of clarity.

FIG. 2 is an elevation similar to a part of FIG. 1 but showing a portion of the apparatus in a position which the trimming mechanism occupies during the actual trimming or cutting of the fruit.

FIG. 3 is a diagrammatic elevational view, on a reduced scale, illustrating the apparatus for actuating the trimming mechanism of FIGS. 1 and 2.

FIG. 4 is an enlarged perspective showing the cutting element of the trimming mechanism illustrated in FIGS. 1 and 2.

While the mechanism of the present invention may be used in conjunction with a variety of modern fruit processing equipment or by itself as an individual piece of processing equipment, it is particularly adapted for use with the apparatus shown and described in the pending U.S. Pat. application, Ser. No. 221,174 to Gerald R. Anderson et al., which is assigned to the assignee of the present invention. Furthermore, while the trimming mechanism of the present invention may be used with different types of fruit, it is particularly useful for trimming the elongated stem ends of pears to cut off projecting stem portions and to eliminate the fragile pointed ends which have been, in the past, easily bruised or crushed to leave an unattractive "mushy" appearance. The trimming mechanism will, therefore, be described with relation to its use in a pear processing system as set forth in the aforementioned patent application. The trimming operation is adapted to be carried out upon whole pears which have previously been peeled and cored and which are arranged in an oriented position with their hollow, cored axes in an approximately vertical position.

As seen in FIG. 1, a conveyor 10 comprised of a plurality of serially arranged fruit supporting cups 12 is positioned with respect to a movable frame structure 14 so that the two may be moved conjointly during certain time intervals in which coring and slicing operations are performed upon the fruit by suitable mechanisms (not shown) mounted upon the frame structure. A part of this existing fruit processing machinery consists of a fruit lifting device L which is provided to aid in the splitting operation by unseating or lifting the pears P from the fruit supporting cups 12. In order to mount the fruit lifting device, pivot brackets 16 are secured to the frame 14 at both sides of the conveyor (one bracket only being shown in FIG. 1). The brackets are connected by a pivot rod 18 which is journaled therein and which has affixed thereto a pair of pivot arms 20 extending parallel to the conveyor on either side thereof. The pivot arms are joined at their distal ends by an angle iron 22 and a holding bar 23 which mounts an upstanding tubular member 24 directly beneath the conveyor 10 for movement into and out of one of the fruit holding cups 12 during the splitting of the fruit. This apparatus and its operation are fully described in the aforementioned pending patent application and form no part of the present invention.

A flat mounting plate 26 is bolted to the angle iron 22 and extends rearwardly beneath the conveyor 10. At the trailing end of plate 26 there is firmly attached a mounting block 27 by means of bolts 28. A trimming mechanism 30 is situated upon the mounting block directly behind the tubular member 24 and, during operation of the apparatus, the trimming mechanism enters a fruit receiving cup which is immediately behind the cup entered by the tubular member. It will be understood that the cups 12 of the conveyor 10 are disposed in transverse rows and longitudinal lanes and, accordingly, there is one lifter tube 24 for each lane and one trimming mechanism for each lane, such plural structure being further illustrated and described in the aforementioned pending patent application. Only one of such lanes has been shown in FIG. 1.

The trimming mechanism 30 includes a cylindrical sleeve 32 which is threaded into the mounting block 27 directly beneath one of the cups of the conveyor 10. A shaft 33 is rotatably received within the sleeve. This shaft is continuously driven during operation of the mechanism by means of a flexible cable 35 which is threaded into the shaft at 36 and is, in turn, driven by an electric motor or similar device (not shown). The sheath of the cable is secured to mounting place 26 by a clamp plate 37 that engages a flange on the sheath, the clamp plate being held in place by the bolts 28. The shaft 33 has a flange 39 at one end that abuts one end of sleeve 32, and a spring clip is disposed in a groove at the other end of the shaft to hold the shaft in the sleeve.

The actual trimming of the fruit is accomplished by a cutting element 40 which has a central stem 41 axially received within a cylindrical passage 42 at the upper end of the shaft 33. The cutting element is fixed within this passage by means of a set screw 44 inserted through a radial passage 45 in the supporting sleeve 32. It can be seen therefore that, as the shaft 33 is rotated by means of the flexible cable 35, the cutting element 40 will be rotated also. When the cutting element is placed adjacent the end of a pear P, it will operate to trim the pear rapidly into the planar shape of its cutting surface.

The cutting element 40 is shown in detail in FIG. 4. The upper or working portion of the cutting element comprises a large, semispherical hub 47 which acts as a guide and is adapted to be received within the hollow cored-out portion (indicated by dashed lines in FIG. 1) of the pear to be trimmed, and a fragmentary disc 49 which has a sharp cutting edge 50 and a flat upper surface 51.

In the grade of pears that is used for fruit cocktail, it often happens that the stem of a pear is misaligned from a central stem-blossom axis. Accordingly, when such a pear in one of the cups 12 is engaged by a stemming tube to cut the longitudinal cylindrical opening 56 therein, the end E of the stem is not removed from the pear, as shown by pears P' and P'' in FIG. 1. It will be evident that, when the rapidly rotating cutter 40 is moved upwardly into engagement with the pear, the downwardly projecting stem end will assume a position in front of the cutting edge 50 and will be progressively cut off as the cutter moves upwardly.

In one successful cutter arrangement, the fragmentary disc portion of the cutter body had a diameter D of seven-eighth inches and a thickness T of 0.25 inches. The cutting edge 50 was slanted 15° from a radial line R and the included angle, moving clockwise from line R to radial line S was 205°. The converging surfaces forming the cutting edge 50 defined an angle X of 30°. With this arrangement and with the cutter rotating counterclockwise in the range of from about 1,450 to 1,725 r.p.m., the opening between radial lines R and S was sufficient to permit stem fragments to become positioned in front of the cutting edge 50 and be progressively cut off.

Also, with this arrangement, the flat top surface 51 has sufficient area to support the pear, after a flat spot has been cut on the pear, and to prevent the cutter from cutting deeper as will occur when the area is too small.

The apparatus for lifting the cutter 40 into and out of the fruit holding cups 12 is the same as that used to operate the fruit lifting device L and is fully described in the aforementioned pending Anderson et al. Pat. application Ser. No. 221,174. This apparatus is shown schematically in FIG. 3. It can therein be seen that each of the outer lifting arms 20 which mount the cutter 40 is pivotally attached to a lifter arm 65 which is, in turn, pivoted to a rigid link 66. The two links 66 are fixed to a tubular rockshaft 68 which is mounted in bearings 69 attached to a portion 70 of the fixed frame structure of the machine. Rockshaft 68 also rigidly mounts a cam follower arm 71 including a cam follower 72 which is adapted to ride in a track 75 formed in the face of the cam 76. As the cam 76 is rotated by means of a second shaft 78, the cam follower arm 71 will be rotated and, consequently, the trimming mechanism 30 will be lifted within one of the fruit holding cups 12 to perform the trimming operation. Further details of the mechanism for actuating the arms 20 are contained in the above-mentioned Anderson et al. application and reference may be had to said application for details of structure and operation not found herein.

It can be seen that the present invention provides a member for rapidly and efficiently trimming the projecting stem portions of pears or similar fruit to leave a generally flat end that needs no expensive hand trimming to put it in condition for further processing. The apparatus may be easily installed and adapted to presently existing machinery. While preferred embodiments of the invention have been described herein it should be understood that various changes may be made in the construction without departing from the spirit of the invention as defined in the appended claims.

I claim:

1. A fruit trimming mechanism of the type adapted to be rotated at relatively high speeds while moving toward and disposed in abutting contact with an end of a fruit having a stem fragment projecting from said end, said mechanism comprising a cutter in the form of a fragmentary disc mounted for rotation about the central axis of the disc, and means for rotating said disc, said fragmentary disc having a flat fruit engaging surface which lies in a plane perpendicular to the axis of disc rotation, said disc being cut-away over a large part of its angular extent to provide an opening bounded at its trailing margin by a cutting edge which cutting edge lies in the same plane with the said flat surface and extends inwardly from the periphery of the disc in a direction generally toward the axis of the disc, said cut-away portion being adapted to receive a stem fragment projecting from the fruit as the cutter approaches the stem end of the fruit thereby permitting the stem fragment to become positioned in the path of movement of said cutting edge.

2. A fruit trimming mechanism according to claim 1 wherein said cutting edge is formed by a wedge-shaped member having two flat intersecting faces whose line of intersection define the said cutting edge, and wherein one of said faces is coplanar with the said flat surface of the said disc.

3. A fruit trimming mechanism according to claim 1 wherein the angular extent of the cut-away portion is approximately 155°.

4. A fruit trimming mechanism according to claim 3 wherein said cutter-rotating means is adapted to rotate said disc at a speed in the range of from about 1,450—1,725 r.p.m.

5. A fruit trimming mechanism according to claim 1 wherein means is provided for forming a relieved portion below and trailing said edge.

6. A fruit trimming mechanism according to claim 1 wherein the diameter of said disc is approximately seven-eighths inches.

7. A fruit trimming apparatus according to claim 6 wherein said disc is approximately 0.25 inches in thickness, and said cutting edge is formed by a wedge-shaped member having an included angle of about 30°.

8. The mechanism of claim 1 wherein said flat fruit engaging surface lies in a horizontal plane and is substantially vertically aligned with an overhead piece of fruit.